United States Patent [19]

Nezu et al.

[11] Patent Number: 5,533,597
[45] Date of Patent: Jul. 9, 1996

[54] SUSPENSION CONTROL DEVICE

[75] Inventors: Takashi Nezu, Tokyo; Kenjiro Matsumoto, Kawasaki; Takao Kohara; Hiroshi Sakai, both of Tokyo; Masaaki Uchiyama, Yokohama, all of Japan

[73] Assignee: Tokico Ltd., Kanagawa-ken, Japan

[21] Appl. No.: 506,756

[22] Filed: Jul. 26, 1995

Related U.S. Application Data

[63] Continuation of Ser. No. 254,489, Jun. 6, 1994, abandoned, which is a continuation of Ser. No. 7,576, Jan. 22, 1993, abandoned.

[30] Foreign Application Priority Data

Feb. 3, 1992 [JP] Japan ..................... 4-017915
Jan. 8, 1993 [JP] Japan ..................... 5-002148

[51] Int. Cl.$^6$ ............................. F16F 9/46; B60G 17/06
[52] U.S. Cl. .................... 188/319; 188/280; 280/707
[58] Field of Search ...................... 188/280, 282, 188/299, 319, 320, 322.15, 322.22; 280/707, 714; 267/64.15

[56] References Cited

U.S. PATENT DOCUMENTS

| | | | |
|---|---|---|---|
| 3,807,678 | 4/1974 | Karnopp et al. ............ | 248/358 R |
| 3,827,538 | 8/1974 | Morgan ..................... | 188/319 |
| 4,729,459 | 3/1988 | Inagaki et al. ............. | 188/319 |
| 4,799,577 | 1/1989 | De Carbon .................. | 188/299 |
| 4,887,699 | 12/1989 | Ivers et al. ............... | 188/322.13 |
| 5,004,079 | 4/1991 | Ivers et al. ............... | 188/282 |
| 5,129,488 | 7/1992 | Furuya et al. .............. | 188/322.15 |
| 5,139,119 | 8/1992 | Karnopp .................... | 188/299 |
| 5,158,161 | 10/1992 | Yamaoka et al. ............. | 188/322.14 |
| 5,248,015 | 9/1993 | Yoshioka et al. ............ | 188/299 |
| 5,295,705 | 3/1994 | Butsuen et al. ............. | 188/319 |
| 5,307,907 | 5/1994 | Nakamura et al. ............ | 188/299 |
| 5,310,027 | 5/1994 | Nakamura et al. ............ | 188/299 |
| 5,324,066 | 7/1994 | Masamura et al. ............ | 188/299 |

FOREIGN PATENT DOCUMENTS

| | | |
|---|---|---|
| 1450441 | 9/1976 | United Kingdom . |
| 2229253 | 9/1990 | United Kingdom . |
| 2256026 | 11/1992 | United Kingdom . |
| 8606807 | 11/1986 | WIPO . |
| 8806983 | 9/1988 | WIPO . |

OTHER PUBLICATIONS

J. P. De Hartog, Mechanische Schwingungen, cover page and pp. 114–121, 1936.

*Primary Examiner*—Robert J. Oberleitner
*Assistant Examiner*—Chris Schwartz
*Attorney, Agent, or Firm*—Biebel & French

[57] ABSTRACT

The present invention provides a suspension control device with which the damping coefficient of the suspension can be easily adjusted on the basis of only the vertical vibration of a body of a vehicle, without measurement of the relative velocity or the relative displacement between the body and the wheel along the vertical direction. The absolute velocity of the body 1 is calculated on the basis of the detected signal of the acceleration sensor attached to the body 1, then the rotation angle $\theta$ of the movable plate is calculated on the basis of the absolute velocity, and the movable plate is rotated in the predetermined direction by the rotation angle $\theta$. Accordingly, the damping coefficient is adjusted so that the coefficient in the extension of the shock absorber becomes larger and the coefficient in the compression of the shock absorber becomes smaller, or so that the damping coefficient in the extension becomes smaller and the coefficient in the compression becomes larger.

16 Claims, 12 Drawing Sheets

CONTROL SIGNAL [θ]

FIG.5
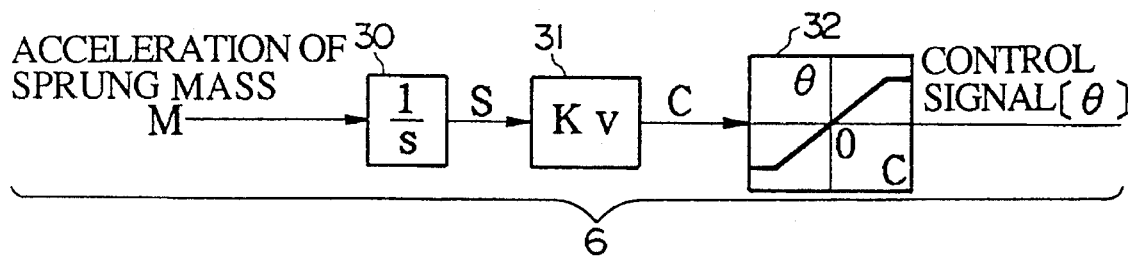
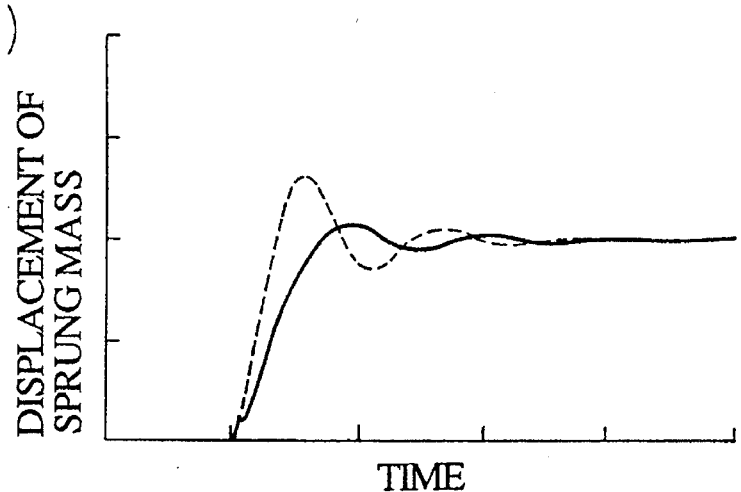
FIG-6(a)
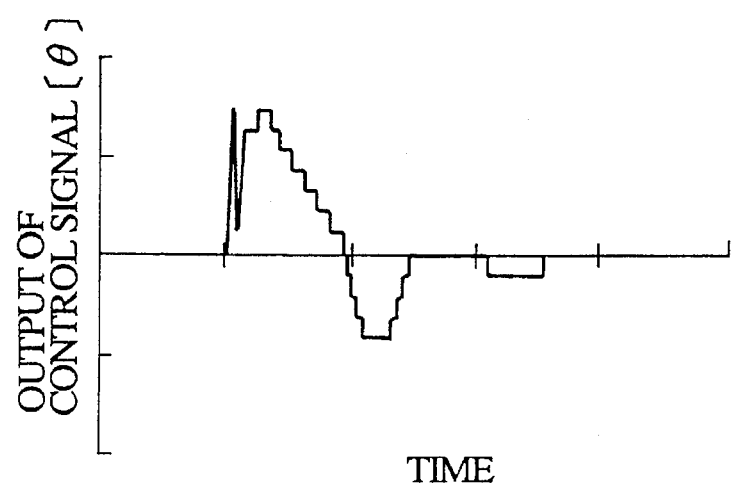
FIG-6(b)

FIG.7
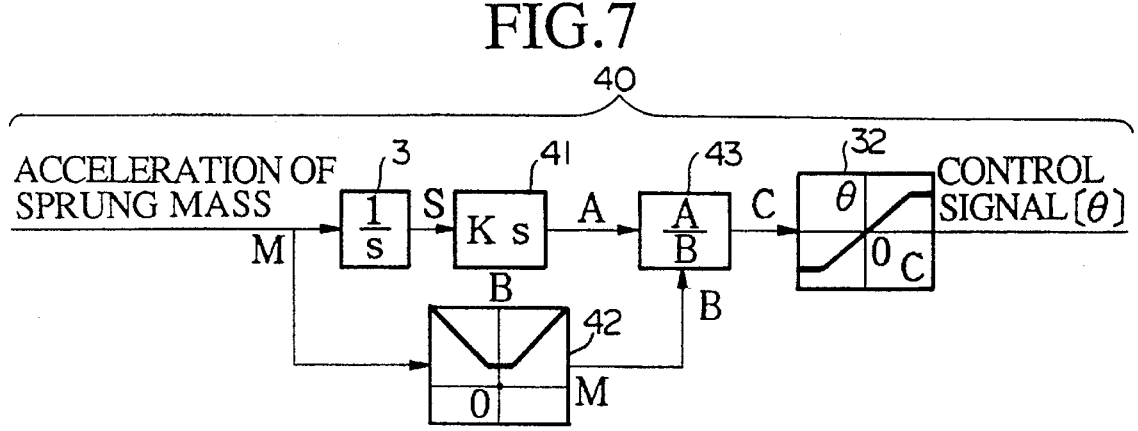
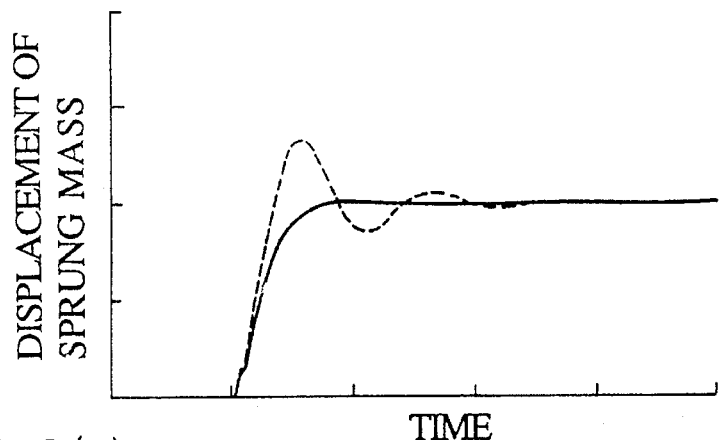
FIG-8(a)
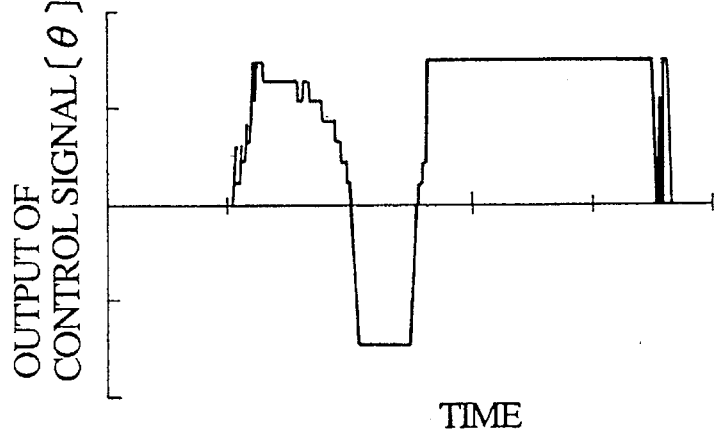
FIG-8(b)

FIG.14
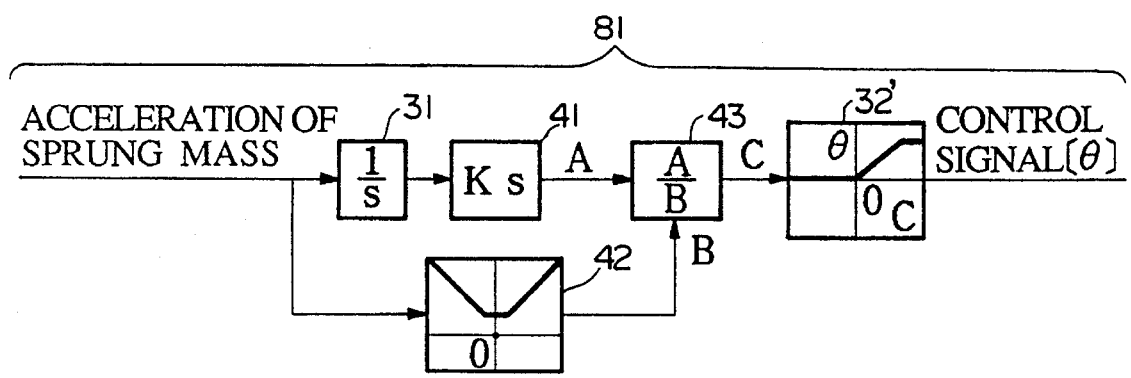
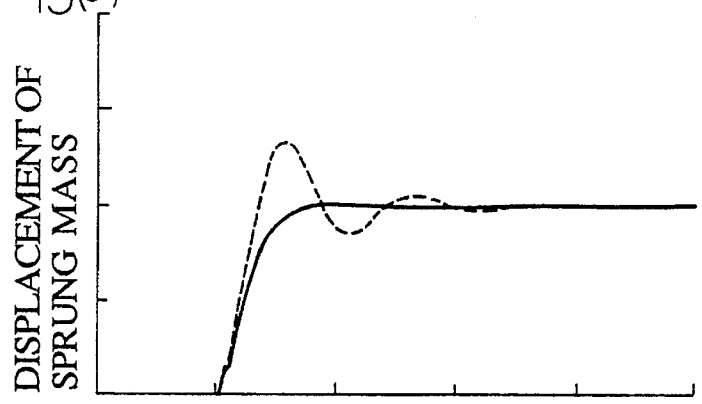
FIG-15(a)
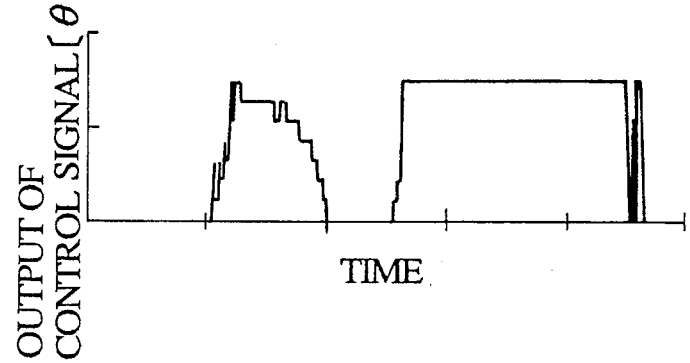
FIG-15(b)

| | | DIRECTION OF MOVEMENT OF SPRUNG MASS | |
|---|---|---|---|
| | | ↗ (S>0) | ↘ (S<0) |
| STROKE OF SHOCK ABSORBER | EXTENSION (S−X) > 0 | C (VARIABLE) | Cmin (CONSTANT) |
| | COMPRESSION (S−X) < 0 | Cmin (CONSTANT) | C (VARIABLE) |

SUSPENSION CONTROL DEVICE

This is a continuation of Ser. No. 08/254,489 filed Jun. 6, 1994 abandoned which is a continuation of Ser. No. 08/007,576 filed Jan. 22, 1993 abandoned.

BACKGROUND OF THE INVENTION

1. Industrial Field of the Invention

The present invention relates to a suspension device provided between the wheel (or the axle) and the body of a vehicle, and in particular, to a suspension control device suitable as a semi-active suspension which makes the damping coefficient change continuously according to the vibration state of the vehicle.

2. Related Art

Conventionally, some proposals with respect to improvements of the vibration transmission characteristics of a suspension which can make the damping coefficient change according to the state of the Vertical vibration of the vehicle, are disclosed in the U.S. Pat. No. 3,807,678, on pages 619–626 of "ASME, Journal of Engineering for Industry" No. 96-2, published in May, 1974, and the like. As described in the documents, a method is known for controlling the coefficient by judging the sign of the product of the absolute velocity S of a sprung mass (a body) which is the velocity of the vertical vibration of the body and the relative velocity of the sprung mass (the body) to the unsprung mass (a wheel). A method for controlling the coefficient by judging the sign of the product of the relative displacement of the sprung mass (the body) to the unsprung mass (the wheel) and the relative velocity thereof, is known, as described in the U.S. Pat. No. 4,821,849.

The former control method will be briefly explained as follows.

In the theory of damping, it has been known that good damping characteristics are obtained by providing a shock absorber which generates a damping force to the absolute velocity S of the sprung mass (the body), between the sprung mass (the body) and a point restricted by the absolute coordinate system. However, in a car, it is impossible to attach a shock absorber to the absolute coordinate system in practice. Therefore, it is considered to approximate that by providing a shock absorber between the sprung mass (the body) and the unsprung mass (the wheel) in parallel so that the damping force of the shock absorber is variable. In this case, the shock absorber provided between the sprung mass and the unsprung mass (the wheel) generates damping force in only the direction contrary to the extension or the compression of the shock absorber. Accordingly, the shock absorber sometimes cannot generate the damping force in the same direction as that of the shock absorber provided between the sprung mass and the absolute coordinate system. Therefore, the damping force at that time is deemed to be zero.

The above concept is shown in equation form as follows.

$$IF\ S(S-X) > 0 \quad (1)$$

$$F = -C_s S = -C(S-X) \quad (2)$$

$$C = C_s S/(S-X) \quad (3)$$

$$IF\ S(S-X) < 0 \quad (4)$$

$$F = 0 \quad (5)$$

$$C = 0 \quad (6)$$

wherein,

- S: absolute velocity of the sprung mass (the body);
- X: absolute velocity of the unsprung mass (the wheel);
- F: damping force of the shock absorber;
- Cs: damping coefficient of the shock absorber provided between the sprung mass and the absolute coordinate system;
- C: damping coefficient of the shock absorber provided between the sprung mass and the unsprung mass (the wheel).

Therefore, it is possible to obtain good damping characteristics similar to that of the shock absorber provided between the sprung mass and the absolute coordinate system, by controlling the damping coefficient C of the shock absorber provided between the sprung mass and the unsprung mass (the wheel) according to the equations (3) and (6), and to the conditions as shown in the equations (1) and (4).

However, the above described techniques require measuring the relative displacement between the body of the sprung mass and the wheel of the unsprung mass, or the relative velocity between them along the vertical direction. Therefore, in order to use such a technique for a vehicle, a vehicle height sensor for detecting the distance between the body and the wheel generally had to be attached under the body.

When a vehicle having such a vehicle height sensor is used in an area where it snows, snow often adheres to the height sensor during travelling, and freezes it. When one begins to operate the vehicle the next morning, the destruction of the height sensor often occurs due to operating the linkage or the like of the height sensor by force.

SUMMARY OF THE INVENTION

The present invention was developed in view of the above circumstances.

An object of the present invention is to provide a suspension control device in which the damping coefficient of the suspension can be easily adjusted on the basis of only the vertical vibration of the body of a vehicle, without measurement of the relative velocity or the relative displacement, between the body and the wheel along the vertical direction, that is, without any vehicle height sensor.

In order to achieve the above object, the suspension control device according to the present invention comprises: a shock absorber of a variable damping coefficient type provided between the body and the wheel of a vehicle wherein when the damping coefficient thereof during compression is a small value, the damping coefficient during extension varies between a small value and a large value, and when the damping coefficient during extension is a small value, the damping coefficient during compression varies between a small value and a large value; a vertical vibration detecting means for detecting the vertical vibration of the body of a vehicle with respect to the absolute coordinate system; and a controller for determining the absolute velocity of the vertical vibration of the body on the basis of the detected signal from the vertical vibration detecting means, wherein the controller outputs a control signal to the shock absorber of the variable damping coefficient type so that the control signal makes the damping coefficient during compression have a small value and makes the damping coefficient during extension have a large value when it is judged that the body is moving in the upper direction on the basis of the absolute velocity, and the control signal makes the damping coefficient during extension have a small value and makes the damping coefficient during compression have a large value when it is judged that the body is moving in the lower direction on the basis of the absolute velocity.

According to the present invention, the absolute velocity of the vertical vibration of the body is computed; and on the basis of the direction of the absolute velocity, the damping coefficient is adjusted so that the damping coefficient during extension is a large value when the damping coefficient during compression of the shock absorber is a small value, or the damping coefficient during compression is a large value when the damping coefficient during extension of the shock absorber is a small value. Accordingly, the present invention does not require any height sensor for detecting the relative velocity or the relative displacement between the body and the wheel along the vertical direction. Thus, it is possible to avoid the destruction of the height sensor.

Preferably, the present invention has a construction so that the controller outputs a control signal to the shock absorber of the variable damping coefficient type so that the control signal makes the damping coefficient during compression have a small value and makes the damping coefficient during extension approximately equal to the value of the product of the absolute velocity and a control gain when it is judged that the body is moving in the upper direction on the basis of the absolute velockty, and so that the control signal makes the damping coefficient during extension have a small value and makes the damping coefficient during compression approximately equal to the value of the product of the absolute velocity and the control gain when it is judged that the body is moving in the lower direction on the basis of the absolute velocity.

In this case, the damping coefficient is determined so that the coefficient is approximately equal to the value of the product of the absolute velocity and a control gain. Accordingly, it is possible to determine the value of the necessary damping coefficient.

In this case, the control gain is preferably variable. Furthermore, it is preferable that as the absolute value of an acceleration of the body becomes larger, said control gain becomes smaller.

Preferably, the present invention has a construction so that the controller outputs a control signal to the shock absorber of the variable damping coefficient type so that the control signal makes the damping coefficient during compression have a small value and makes the damping coefficient during extension approximately equal to the value which is obtained by correcting the product of the absolute velocity and a control gain on the basis of the inverse of the absolute value of the acceleration of the vertical vibration when it is judged that the body is moving in the upper direction on the basis of the absolute velocity, and so that the control signal makes the damping coefficient during extension have a small value and makes the damping coefficient during compression approximately equal to the value which is obtained by correcting the product of the absolute velocity and a control gain on the basis of the inverse of the absolute value of an acceleration of the vertical vibration when it is judged that the body is moving in the lower direction on the basis of the absolute velocity.

In the invention, the damping coefficients during extension and compression of the shock absorber are corrected on the basis of the inverse of the absolute value of the acceleration of the vertical vibration of the body.

The meaning of the absolute value of the acceleration of the vertical vibration of the body will be explained as follows.

There is a relationship between the acceleration of the body, the damping force of the shock absorber, and the relative velocity of the shock absorber, as follows. The acceleration of the body located in the sprung mass is approximately proportional to the damping force of the shock absorber. The damping force of the shock absorber is approximately proportional to the relative velocity of the shock absorber.

In other words, to correct the damping coefficient according to the inverse of the absolute value of the acceleration of the body, i.e., "to divide by the absolute value of the acceleration of the body" has the same meaning as to divide by the relative velocity of the shock absorber. The smaller the relative velocity of the shock absorber is, the larger the damping characteristics can be obtained.

Preferably, the suspension control device according to the present invention comprises: a shock absorber of a variable damping coefficient type provided between the body and the wheel of a vehicle in which the damping coefficient thereof during compression of the shock absorber is approximately constant and the damping coefficient during extension is variable between a small value and a large value; a vertical vibration detecting means for detecting the vertical vibration of the body of the vehicle to the absolute coordinate system; and a controller for determining the absolute velocity of the vertical vibration of the body on the basis of the detected signal from the vertical vibration detecting means, wherein the controller outputs a control signal to the shock absorber of the variable damping coefficient type so that the control signal makes the damping coefficient during extension have a large value when it is judged that the body is moving in the upper direction on the basis of the absolute velocity, and makes the damping coefficient during extension have a small value and the control signal makes the damping coefficient during extension have a large value when it is judged that the body is moving in the lower direction on the basis of the absolute velocity.

In the invention, the absolute velocity of the vertical vibration of the body is calculated and on the basis of the absolute velocity, the controller outputs a control signal to the shock absorber of the variable damping coefficient type so that the control signal makes the damping coefficient during extension have a large value when it is judged that the body is moving in the upper direction on the basis of the absolute velocity, and makes the damping coefficient during extension have a small value and the control signal makes the damping coefficient during extension have a large value when it is judged that the body is moving in the lower direction on the basis of the absolute velocity. Accordingly, it is possible to simplify the content of control in comparison with the control according to the first invention. The present invention does not require any height sensor for detecting the relative velocity or the relative displacement between the body and the wheel along the vertical direction, similar to the first invention. Thus, it is possible to avoid the destruction of the height sensor.

In this case, the control gain is preferably variable. Furthermore, it is preferable that as the absolute value of an acceleration of the body becomes larger, said control gain becomes smaller.

BRIEF DESCRIPTION OF THE DRAWINGS

FIG. 5 is a block diagram showing the construction of the controller 6.

FIGS. 6(a) and (b) are graphs showing the relationship between the output for control when the vehicle runs on a step and the displacement of the sprung mass when the vehicle is controlled by the controller 6.

FIG. 7 is a block diagram showing the construction of the controller 40 in the second embodiment.

FIGS. 8(a) and (b) are graphs showing the relationship between the output for control when the vehicle runs on a step and the displacement of the sprung mass.

FIG. 14 is a block diagram showing the construction of the controller 81 in the fifth embodiment.

FIGS. 15(a) and (b) are graphs showing the relationship between the output for control when the vehicle runs on a step and the displacement of the sprung mass when the vehicle is controlled by the controller 81.

DETAILED DESCRIPTION OF THE INVENTION

Hereinafter, a first embodiment of the invention will be explained with reference to FIGS. 1–6.

Figure 1:
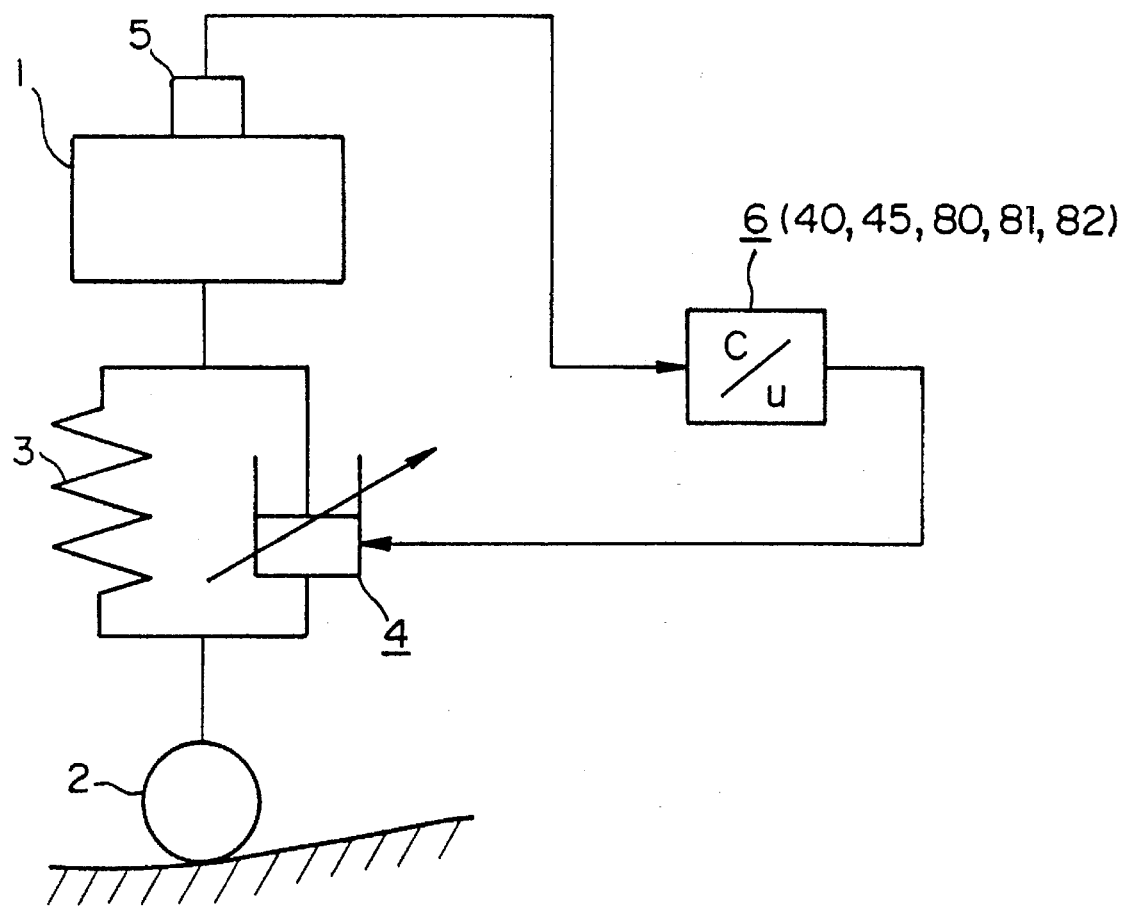
FIG. 1 is a general view showing a suspension device.

FIG. 1 is a general view showing a suspension device for a wheel of a vehicle.

In this Figure, numeral 1 is a body (the sprung mass) of a vehicle, and numeral 2 is a wheel (the unsprung mass) which is in the side of an axle. Between the body 1 and the wheel 2, a compression spring 3 and a shock absorber 4 of a variable damping coefficient type are provided in parallel.

An acceleration sensor 5 which is a detecting means for detecting the state of the vertical vibration of the body 1, is attached to the body 1 which is located on the compression spring 3. The detected signal with respect to the acceleration therefrom is introduced to a controller 6. The controller 6 computes in a predetermined manner as shown in FIG. 5 on the basis of the detected signal outputted from the acceleration sensor 5, and appropriately sets the desired value C of a damping coefficient of the shock absorber 4 of a variable damping coefficient type on the basis of the computed results, as will be described herein below.

Next, the control theory according to the present invention will be explained, as follows.

In the control method as described in the prior art, the damping coefficient C of the shock absorber 4 which is provided between the body 1 and the wheel 2 is defined by the following equations.

$$IF\ S(S-X) > 0 \tag{1}$$

$$C = C_s S/(S-X) \tag{3}$$

$$IF\ S(S-X) < 0 \tag{4}$$

$$C = 0 \tag{6}$$

However, since the present invention does not use a height sensor and uses the acceleration sensor 5, it is impossible to obtain "S–X". Therefore, the equation (3) is approximated by using the following two equations.

(i) Control rule I

The damping coefficient C is controlled on the basis of the relationship of the following equations by deeming the "S–X" as shown in the equation (3) as an average constant value.

$$C = K_v S \tag{7}$$

Kv: a constant

The absolute velocity S of the sprung mass (body 1) is obtained by integrating the value. M of the acceleration sensor 5. This control is carried out by only the velocity of the sprung mass (body 1). Therefore, it is possible to lower the frequency for control and the control has an advantage with respect to the computing time of the controller 6.

(ii) Control rule II

The damping coefficient C is controlled on the basis of the relationship of the following equations by using the value M of the sprung mass (the body) instead of the "S–X" in the equation (3).

$$C = K_s S/M \tag{8}$$

Ks: a constant

The acceleration M of the sprung mass is proportional to the force working on the sprung mass. The force is expressed by the sum of the damping force F which is proportional to the relative velocity (S–X) as shown in the equation (2) and the spring force. However, when the vibration is controlled, the relative velocity is large enough to neglect the change of the spring force. Therefore, the force working on the sprung mass is proportional to the damping force F and the acceleration M of the sprung mass is proportional to the relative velocity (S–X). Accordingly, the acceleration M of the sprung mass can be used instead of the relative velocity (S–X).

Using the above control rules I and II, it is possible to obtain the damping coefficient C by using only the value M of the acceleration sensor 5 and by not using the equation (3). Therefore, the damping coefficient can be determined by the following equations.

IF S(S–X)>0          (1)

$C = KvS$          (7)

$C = KsS/M$          (8)

IF S(S–X)<0          (4)

$C = Cmin$          (9)

The reason why the damping coefficient is Cmin, and not 0, when S (S–X)<0, is as follows.

If the damping force is completely eliminated, an unstable state is caused before the control follows it, because control is always delayed with respect to the vibration changes. Therefore, it has been determined that C=Cmin in order to give a minimum damping force.

Figures 18, 19:
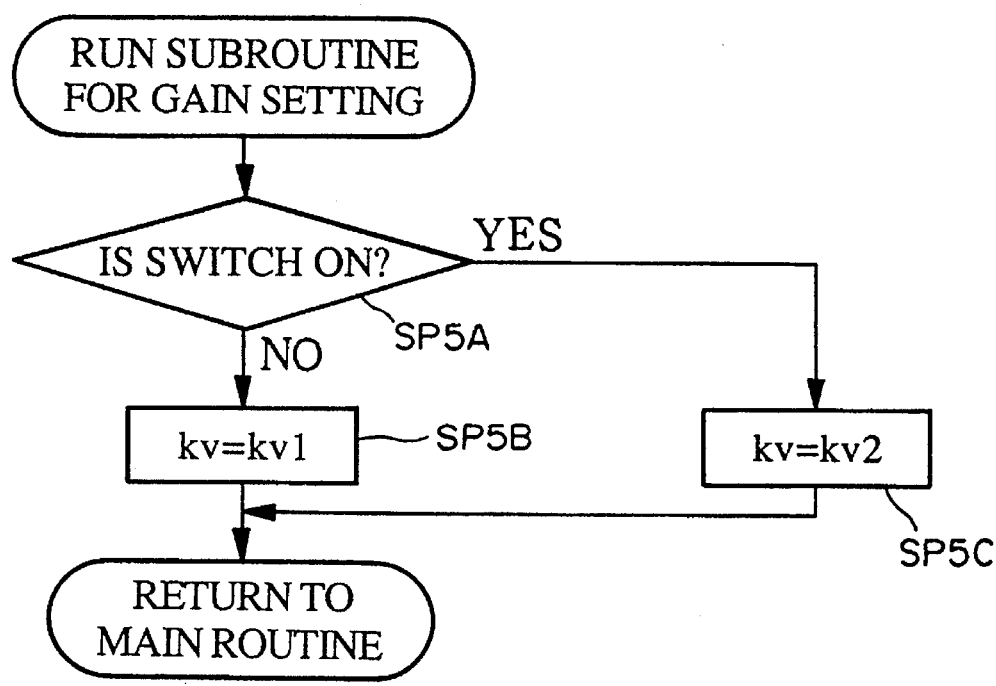
FIG. 18 is a flow chart showing a subroutine in the step SP 5 in FIG. 17.
FIG. 19 is a table showing the relationship between the direction of movement of the sprung mass and the stroke of the shock absorber.

The above described relationship is shown in the table in FIG. 19.

However, the stroke of the shock absorber as shown in the table in FIG. 19 can be judged by the acceleration sensor 5. The present invention does not require such a judgement by adopting a shock absorber in which the damping coefficient during compression of the shock absorber is a small constant value, when the damping coefficient during extension is variable, and conversely, in which the damping coefficient during extension of the shock absorber is a small constant value, when the damping coefficient during compression is variable. That is, the present invention adopts a shock absorber in which the damping coefficient is variable as shown by broken lines in FIG. 4. Accordingly, the shock absorber itself selects the damping coefficient in the stroke of the shock absorber by only adjusting the rotation angle θ of the movable plate on the basis of the movement direction S of the sprung mass. That is, the damping coefficient can be controlled independently of the stroke of the shock absorber, according to the left side (θ<0) with respect to the axis of ordinates in FIG. 4 when the movement direction of the sprung mass is positive (S>0), and according to the right side (θ>0) with respect to the axis of ordinates in FIG. 4 when the movement direction of the sprung mass is negative (S<0).

Figure 4:
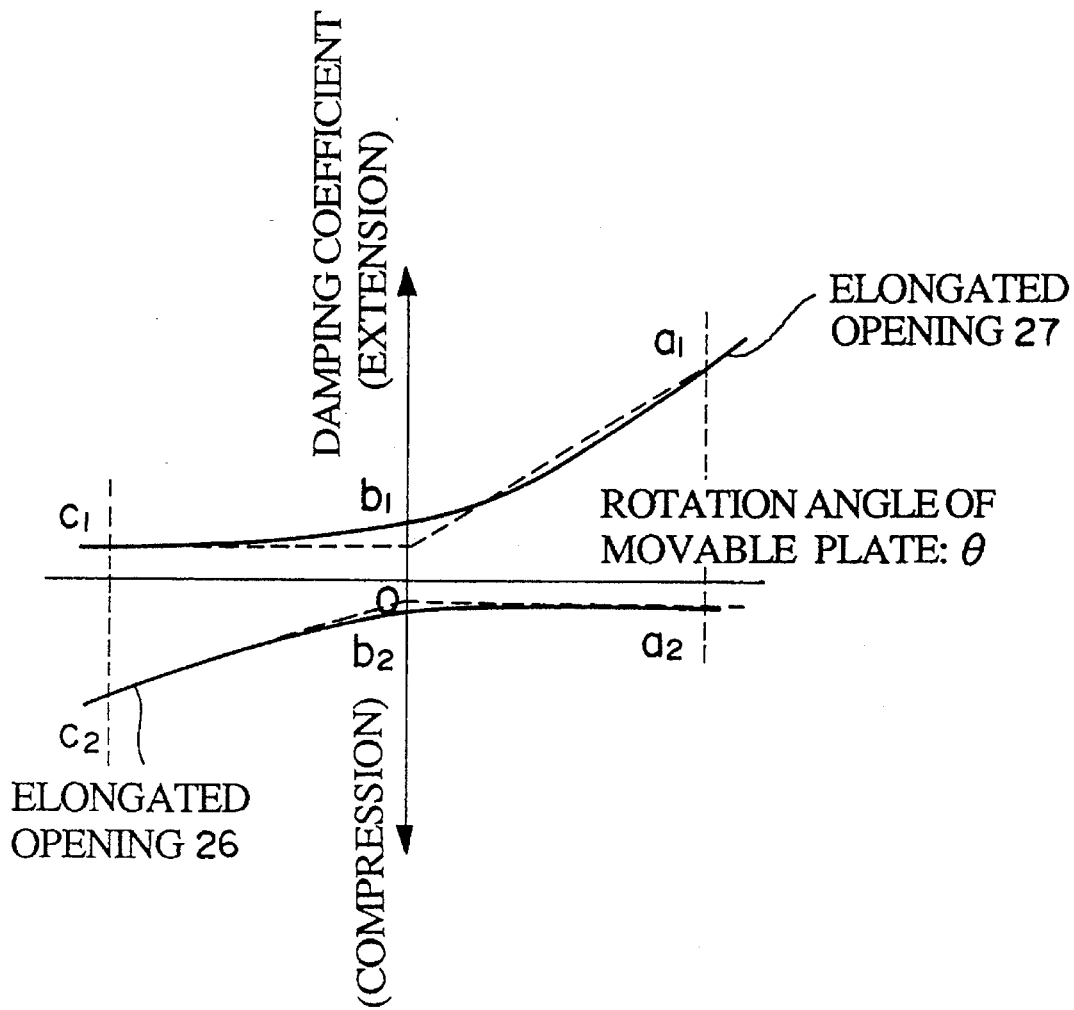
FIG. 4 is a graph showing the relationship between the rotation angle of the movable plate 25, the damping coefficients during extension, and the damping coefficients during compression.

Next, the concrete structure of the shock absorber 4 of a variable damping coefficient type which can obtain the damping coefficient as shown in FIG. 4 will be explained with reference to FIG. 2.

Figure 2:
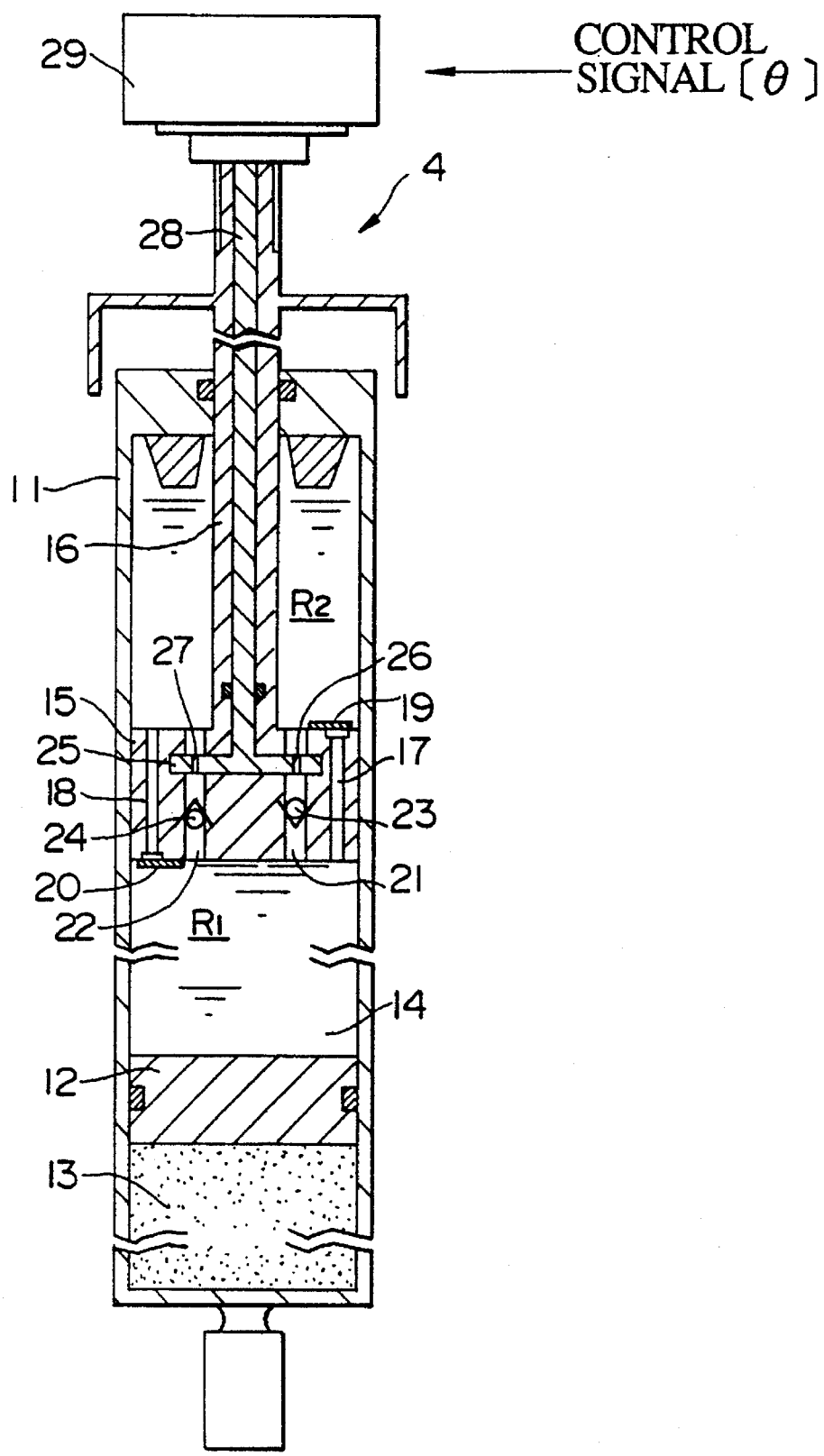
FIG. 2 is a sectional view showing the construction of a shock absorber 4 of a variable damping coefficient type.

In FIG. 2, a free piston 12 is slidably inserted in a cylinder 11 leaving no space between them. The inside of the cylinder 11 is divided into a gas chamber 13 and an oil chamber 14 by the free piston 12. The gas chamber 13 is filled with a high pressure gas, and the oil chamber 14 is filled with an oil liquid.

A piston 15 is slidably inserted in the oil chamber 14 leaving no space between them. The inside of the oil chamber 14 is divided into a lower chamber R1 and an upper chamber R2 by the piston 15. A piston rod 16 which extends outside the cylinder 11 through the upper chamber R2 is connected to the piston 15.

The piston 15 is provided with a first communication path 17 and a second communication path 18 each of which communicates the lower chamber R1 and the upper chamber R2. A first damping valve 19 is provided on the upper surface of the piston 15. The first damping valve 19, which is usually closed, is opened to communicate the upper chamber R2 and the first communication path 17 when the pressure difference between the lower chamber R1 and the upper chamber R2 reaches a predetermined value by increase of the inner pressure of the lower chamber R1 during shrinkage of the piston rod 16. A second damping valve 20 is provided on the lower surface of the piston 15. The second damping valve 20, which is usually closed, is opened to communicate the lower chamber R1 and the second communication path 18 when the pressure difference between the lower chamber R1 and the upper chamber R2 reaches a predetermined value by increase of the inner pressure of the upper chamber R2 during extension of the piston rod 16.

The piston 15 is provided with a third communication path 21 and a fourth communication path 22 each of which communicates the lower chamber R1 and the upper chamber R2. The third communication path 21 and the fourth communication path 22 are formed in the piston opposite to each other with respect to the axis of the piston rod 16.

Check valves 23 and 24 are provided in the third communication path 21 and the fourth communication path 22 respectively. The check valve 23 admits only the flow of the oil liquid from the lower chamber R1 to the upper chamber R2, and the check valve 24 admits only the flow of the oil liquid from the upper chamber R2 to the lower chamber R1.

A disk-shaped movable plate 25 is held inside the piston 15 so that the movable plate 25 is rotatable around the axis of the piston rod 16. The upper and lower surfaces of the movable plate 25 are arranged across the third communication path 21 and the fourth communication path 22.

Figure 3:
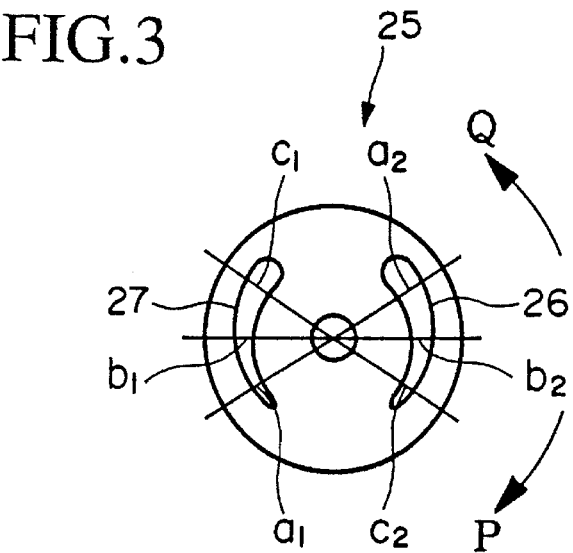
FIG. 3 is a plan view showing a movable plate 25 attached to the shock absorber 4 of a variable damping coefficient type.

A pair of elongated openings 26 and 27 are formed opposite to each other in the movable plate 25 on a circle concentric thereto, as shown in FIG. 3. Each of the elongated openings 26 and 27 is elongated along the periphery of the movable plate. The area of the elongated opening 26 decreases as the elongated opening 26 progresses in the clockwise direction by rotation of the movable plate 25 in the counterclockwise direction, as indicated by the arrow Q in FIG. 3. The area of the elongated opening 27 increases as the elongated opening 27 progresses in the clockwise direction by rotation of the movable plate 25 in the counterclockwise direction, as indicated by the arrow Q in FIG. 3.

When the movable plate 25 is rotated around the axis thereof, the portions of the elongated openings 26 and 27 of the movable plate 25 which face the third communication path 21 and the fourth communication path 22 respectively, are continuously changed. Therefore, the opening area through the third or fourth communication path 21 or 22, and the elongated opening 26 or 27, can be continuously changed. Consequently, it is possible to obtain damping coefficient characteristics as shown by the broken lines in FIG. 4.

In FIG. 2, numeral 28 indicates an operational rod which is provided along the axis of the piston rod 16 so as to rotate relative to the piston rod. The lower end portion of the operational rod 28 is coupled together the movable plate 25. Numeral 29 indicates an actuator such as a stepping motor, which is connected to the upper end of the operational rod 28 in order to rotate the movable plate 25 in the clockwise direction P or in the counterclockwise direction Q through the operational rod 28. The actuator 29 rotates the operational rod 28 according to control signals [θ] supplied from a block 32 which will be described later.

The relationship between portions a2–c2 and a1–c1 of the elongated openings 26 and 27 facing each of the communication paths 21 and 22, and the damping coefficient will be explained with reference to FIGS. 3 and 4.

The positions of each of the communication paths 21 and 22 located in the elongated opening 26 or 27 are indicated by using the angle of the rotation θ of the movable plate 25. The basic position (θ=0) of the movable plate 25 is the position wherein the communication paths 21 and 22 face the centers b2 and b1 of the elongated openings 26 and 27 respectively.

(1) When the movable plate 25 is rotated in the clockwise direction P from a reference position, that is, when the movable plate 25 is rotated in the positive direction (θ>0), the communicating path 21 faces a position a2 of the elongated opening 26 and the communicating path 22 faces a position a1 of the elongated opening 27. Accordingly, the oil liquid easily flows from lower chamber R1 to upper chamber R2, but the oil liquid hardly flows from upper chamber R2 to lower chamber R1. Consequently, the damping coefficient becomes large during extension of the shock absorber, and conversely, the damping coefficient becomes small during compression of the shock absorber.

(2) When the movable plate 25 is rotated in the counter clockwise direction Q from a reference position, that is, when the movable plate 25 is rotated in the negative direction (θ<0), the communicating path 21 faces a position c2 of the elongated opening 26, and the communicating path 22 faces a position c1 of the elongated opening 27. Accordingly, the oil liquid hardly flows from lower chamber R1 to upper chamber R2, but the oil liquid easily flows from upper chamber R2 to lower chamber R1. Consequently, the damping coefficient becomes small during extension of the shock absorber, and conversely, the damping coefficient becomes large during compression of the shock absorber.

In the present invention, it is theoretically desirable that the shock absorber has the characteristics as shown by the broken lines in FIG. 4. The shock absorbers in the embodiments as shown in FIGS. 2 and 3 have the characteristics as shown by the solid lines in FIG. 4 which is a smooth characteristic proximate to the broken lines to change the damping coefficient smoothly. Therefore, the damping coefficients between b1 and c1 in the extension side and between b2 and a2 in the compression side are approximately constant small values, though there is some change in these values.

The construction of the controller 6 will be explained as follows. The controller 6 computes a desired value C of damping coefficient which is used for determining the rotation angle θ of the movable plate 25, according to the above described control rule I, and the movable plate 25 is rotated on the basis of the desired value C. The controller 6 comprises the blocks 30 to 32, as shown in FIG. 5.

The detected signal which represents acceleration detected by the acceleration sensor 5 is inputted to the block 30. The block 30 computes the absolute velocity of the body 1 of the vehicle by integrating the acceleration. The computation of the block 30 is outputted to the next block 31. The reference "s" indicated in the block 30 denotes a Laplacean which is used for the Laplace transformation.

The block 31 is for computing the desired value C for the damping coefficient by multiplying the computation of the block 30 by a control gain Kv. The desired value C includes a positive or negative sign. When the absolute velocity of the body 1 is positive, that is, the body has a velocity in the upward direction, it is defined that the desired value C is positive. To the contrary, when the absolute velocity of the body 1 is negative, that is, the body has a velocity in the downward direction, it is defined that the desired value C is negative. The desired value C for the damping coefficient which is a computation of the block 31, is outputted to the next block 32.

The block 32 determines rotation angle θ of the movable plate 25 on the basis of the desired value C of the outputted damping coefficient from the block 31. That is, the rotation θ of the movable plate 25 is determined according to the magnitude of the absolute velocity of the body 1 and the positive or negative direction of the absolute velocity, as shown in the graph in the block 32 in FIG. 5.

For example, when the absolute velocity of the body 1 becomes larger in the positive direction, i.e., in the upper direction of the body 1, and then the desired value C of the damping coefficient becomes larger in the positive direction, control signal [θ], which makes the rotation angle θ of the movable plate 25 larger in the positive direction in accordance with the relationship of proportion as shown in the graph in the block 32 in FIG. 5, is outputted to the actuator 29. Consequently, the damping coefficient during extension is made larger and the damping coefficient during compression is made smaller, as explained in the above paragraph (1).

To the contrary, when the absolute velocity of the body 1 becomes larger in the negative direction, i.e., in the lower direction of the body 1 and then the desired value C of the damping coefficient becomes larger in the negative direction, control signal [θ], which makes the rotation angle θ of the movable plate 25 larger in the negative direction in accordance with the relationship of proportion as shown in the graph in the block 32 in FIG. 5, is outputted to the actuator 29. Consequently, the damping coefficient during extension is made smaller and the damping coefficient during compression is made larger, as explained in the above paragraph (2).

In the graph in the block 32, the θ is constant in the area in which the absolute value of the desired value C is very large. This is because the rotation angle θ of the movable plate 25 has a physical limitation, that is, when the movable plate 25 rotates by an angle larger than a certain angle, communicating paths 21 and 22 are closed so as not to communicate between lower and upper chambers R1 and R2.

The difference between the case where the movable plate 25 of the variable damping coefficient type shock absorber 4 is controlled by controller 6 and the case where the movable plate 25 of the variable damping coefficient type shock absorber 4 is not controlled by controller 6 will be explained as follows, with reference to FIGS. 6(a) and (b).

The solid line in FIG. 6(a) indicates displacement of the body 1 controlled by the controller 6 when the vehicle runs on a step, and the dotted line indicates displacement of the body 1 not controlled by the controller 6. As seen from FIG. 6(a), it is confirmed that when the variable damping coefficient type shock absorber 4 is controlled by the controller 6, the amplitude of the vibration wave form after running on the step is smaller and good vibration wave form can be obtained as compared with the case that the variable damping coefficient type shock absorber 4 is not controlled by the controller 6.

FIG. 6(b) is a graph showing the output content of the control signal [θ] with respect to time when the variable damping coefficient type shock absorber 4 is controlled by the controller 6. The magnitude of the control signal [θ] is equivalent to the rotation angle θ of the movable plate 25 to be rotated. That is, as the rotation angle θ of the movable plate 25 is larger, the absolute value of the control signal [θ] is larger corresponding to the rotation angle θ.

As explained above in detail, in the suspension control device of the present embodiment, the absolute velocity of the body 1 is computed on the basis of the detected signal of the acceleration sensor 5 attached to the body 1, then the rotation angle θ of the movable plate 25 is computed on the basis of the absolute velocity, and the movable plate 25 is rotated in the direction indicated by the arrow P or the arrow Q according to the rotation angle θ. That is, according to the suspension device, the absolute velocity of the vertical vibration of the body is computed on the basis of the detected signal of the acceleration sensor 5; and on the basis of the absolute velocity, the damping coefficient is adjusted so that the coefficient in the extension of the shock absorber becomes larger and the coefficient in the compression of the shock absorber becomes smaller, or so that the damping coefficient in the extension becomes smaller and the coefficient in the compression becomes larger. Accordingly, the present invention does not require any height sensor for detecting the relative velocity or the relative displacement between the body and the wheel along the vertical direction. Thus, there is no damage incurred due to destruction of the height sensor. Since the suspension control device according to the present invention does not require any height sensor for a vehicle, decreased vehicle production costs may be anticipated.

According to the embodiment, the shock absorber 4 is controlled on the basis of the detected signal of the acceleration sensor 5 attached to the body 1, regardless of the state of extension or compression of the variable damping coefficient type shock absorber 4. Therefore, it is possible to consistently set the damping force of the shock absorber 4 to the optimum value.

Next, a second embodiment of the present invention will be explained with reference to FIGS. 7 and 8 as follows.

The second embodiment is for obtaining the damping coefficient C according to the above described control rule II. The difference between the constructions of the first and second embodiments is the content of the block which constitutes the controller 40. In the second embodiment, the same numerals are given to the parts which have the same construction as that in the first embodiment in order to simplify the explanation thereof.

The controller 40 comprises a block 30 which is the same as that in the first embodiment, for computing the absolute velocity S of the body 1 by integrating the acceleration M of the sprung mass, a block 41 for computing a factor A which corresponds with the desired value C of the damping coefficient in the first embodiment, by multiplying the computation of the block 30 by a gain Ks; a block 42 to which a detected signal representing acceleration is inputted from the acceleration sensor 5, for computing the absolute value B of the inputted acceleration; a block 43 for obtaining the desired value C by dividing the factor A obtained from the block 41 by the absolute value B of the acceleration obtained from the block 42; and a block 32, which is the same as that in the first embodiment, for obtaining the rotation angle θ of the movable plate 25 on the basis of the desired value C computed in the block 43.

In the block 42, acceleration is considered as a constant value in the positive and negative areas in which the acceleration is very small in order to prevent the desired value C of the damping coefficient which is computed in the block 43 from being too large in each of the positive and negative areas.

Next, the content of the block 43 will be explained as follows.

In this block 43, the factor A corresponding with the desired value C of the damping coefficient in the first embodiment is divided by the absolute value B of the vertical acceleration of the body 1 which is located on the spring 3. If the change of the spring force according to the spring 3 is disregarded, the acceleration is proportional to the damping coefficient of the shock absorber 4. Furthermore, the damping coefficient of the shock absorber 4 is proportional to the relative velocity of the shock absorber 4.

The meaning of dividing the factor A by the absolute value B of the acceleration of the body 1 on the spring 3 is equivalent to dividing the factor A by the relative velocity of the shock absorber 4. Therefore, the smaller the relative velocity of the shock absorber 4, that is, the smaller the damping force of the shock absorber 4, the larger the desired value C computed in the block 43. Consequently, it is possible to obtain high damping characteristics to improve vehicle height characteristics of the shock absorber. The absolute value of acceleration, and not acceleration, is used as the B. The reason is that the positive or negative rotational direction of the movable plate 25 is already represented in the factor A.

The difference between the case where the movable plate 25 of the variable damping coefficient type shock absorber 4 is controlled by the controller 40, and the case where the movable plate 25 of the variable damping coefficient type shock absorber 4 is not controlled by the controller 40 will be explained as follows, with reference to FIGS. 8(a) and (b).

The solid line in FIG. 8(a) indicates displacement of the body 1 controlled by the controller 40 when the vehicle runs on a step, and the dotted line indicates displacement of the body 1 not controlled by the controller 40. As seen from FIG. 8(a), it is confirmed that when the variable damping coefficient type shock absorber 4 is controlled by the controller 40, the amplitude of the vibration wave form after running on the step is smaller and good vibration wave form can be obtained as compared to the case where the variable damping coefficient type shock absorber 4 is not controlled by the controller 40.

FIG. 8(b) is a graph showing the output content of the control signal [θ] with respect to time when the variable damping coefficient type shock absorber 4 is controlled by controller 40. The magnitude of the control signal [θ] is equivalent to the rotation angle θ of the movable plate 25 to be rotated. That is, as the rotation angle θ of the movable plate 25 is larger, the absolute value of the control signal [θ] is larger, corresponding to the rotation angle θ.

As explained above in detail, in the suspension control device as described in the second embodiment of the present embodiment, the absolute velocity of the vertical vibration of the body 1 is calculated on the basis of the detected signal of the acceleration sensor 5; and on the basis of the absolute velocity, the damping coefficient is adjusted so that the coefficient in the extension of the shock absorber becomes larger and the coefficient in the compression of the shock absorber becomes smaller, or so that the damping coefficient in the extension becomes smaller and the coefficient in the compression becomes larger. Accordingly, the present invention does not require any height sensor for measuring the relative velocity or the relative displacement, between the body and the wheel along the vertical direction. Furthermore, the smaller the damping force of the shock absorber 4, the larger the resulting damping coefficient characteristics obtainable is. For example, when the vehicle runs on a step, the amplitude of the vibration wave form after running on the step can be rapidly made smaller to improve vehicle height characteristics of the shock absorber.

In the above embodiments, a pair of continuously elongated openings are formed in the movable plate 25 along the periphery thereof so that the damping coefficient can be continuously changed. However, the present invention is not limited to such embodiments. For example, a plurality of openings, e.g., 3 openings on each side, having diameters which are smaller or larger by stages as the openings progress in the clockwise direction, may be formed at the portions a2–c2, and a1–c1 of the movable plate 25, so that the damping coefficient can be adjusted by stages. The number of the openings is not limited to 3 with respect to each of the communicating paths 21 and 22. It is possible to provide 6–7 openings in the movable plate with respect to each of communicating paths to adjust the damping coefficient in a plurality of stages.

Figure 9:
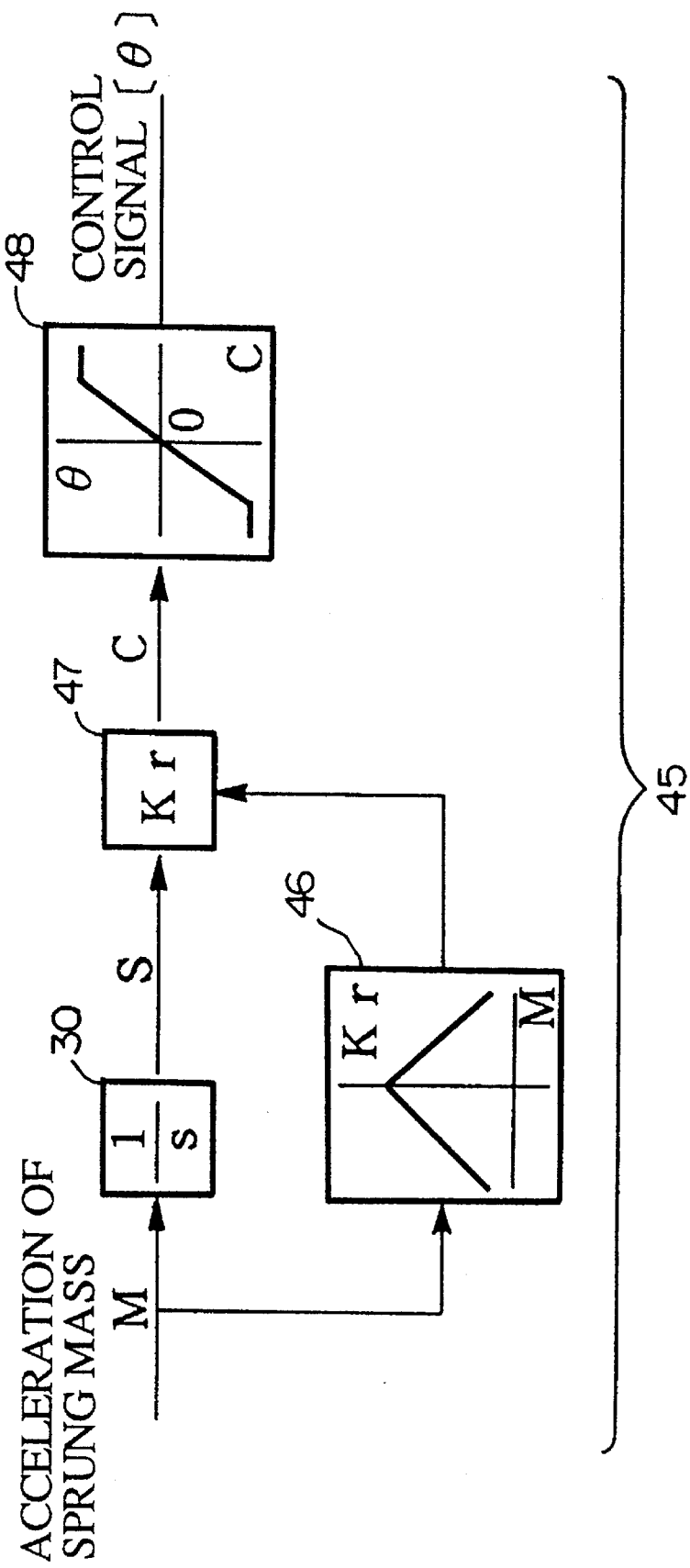
FIG. 9 is a block diagram showing the construction of the controller 45 in the third embodiment.

Next, a third embodiment of the present invention will be explained with reference to FIG. 9 as follows.

The construction of the third embodiment differs from that of the first embodiment in that a variable control gain Kr is used in this embodiment, while a constant control gain Kv is used in the first embodiment. In the third embodiment, the same numerals are given to the parts which have the same construction as that in the first embodiment in order to simplify the explanation thereof.

The controller 45 comprises blocks 30 and 46–48. In the block 30, the absolute velocity S of the body 1 is calculated by integrating the sprung acceleration M outputted from the acceleration sensor 5, thereafter the calculated result is outputted to next block 47, similar to the first embodiment.

Block 46 is for calculating a control gain Kr on the basis of the sprung acceleration M detected by the acceleration sensor 5. The calculated result is outputted to the next block 47. In the block 46, the control gain Kr is set so that as the absolute value of the sprung acceleration M of the body 1 becomes larger, the control gain becomes smaller, and conversely, to the extent the absolute value of the sprung acceleration M of the body 1 is small, the control gain is large, as shown in the graph in the block 46 of FIG. 9.

The block 47 is for obtaining the desired value of the damping coefficient by multiplying the absolute velocity S of the body 1, which is the calculated result of the block 30, by the control gain Kr, which is the calculated result of the block 46.

A block 48 determines and outputs the rotation angle θ of the movable plate 25 on the basis of the desired value C of the damping coefficient outputted from the block 47. In the block 48, the rotation angle θ of the movable plate 25 is determined on the basis of the desired value C of the damping coefficient, by using a graph indicating the relationship between the desired value C of the damping coefficient and the rotation angle θ of the movable plate 25 as shown in FIG. 9.

As explained above in detail, according to the suspension control device as described in the third embodiment of the present invention, it is possible to obtain the effects similar to that of the first or second embodiment of the present invention. In the block 46, the control gain Kr multiplied by the absolute velocity S of the body 1 is set so that, as the absolute value of the sprung acceleration M of the body 1 becomes larger, the control gain becomes smaller, and conversely, as the absolute value of the sprung acceleration M of the body 1 becomes smaller, the control gain becomes larger. In the block 47, the desired value C of the damping coefficient of the variable damping coefficient type shock absorber 4 is calculated by multiplying the control gain Kr by the absolute velocity S of the vertical vibration of the body 1. Therefore, as the vertical vibration of the body 1 becomes larger, the damping coefficient to be set for the variable damping coefficient type shock absorber 4 can be restrained to be relatively lower. Consequently, it is possible to prevent excessive control when the vertical vibration of the body 1 is large. Moreover, the damping coefficient which is to be set to the variable damping coefficient type shock absorber 4 can be set relatively high so that the vertical vibration of the body 1 is small, thus making it possible to prevent lack of control when the vertical movement of the body 1 is small. Consequently, when the vehicle runs on a step, it is possible to effectively lighten the shock that the driver feels when the wheels hit a projection.

Next, a fourth embodiment of the present invention will be explained with reference to FIGS. 10–13 as follows.

A construction of a variable damping coefficient type shock absorber 50 according to the fourth embodiment will be explained with reference to FIG. 10. The variable damping coefficient type shock absorber 50 is provided in parallel to the compression spring 3 between the body 1 and the wheel 2, similar to the variable damping coefficient type shock absorber 4 as shown in the embodiments 1–3.

Figure 10:
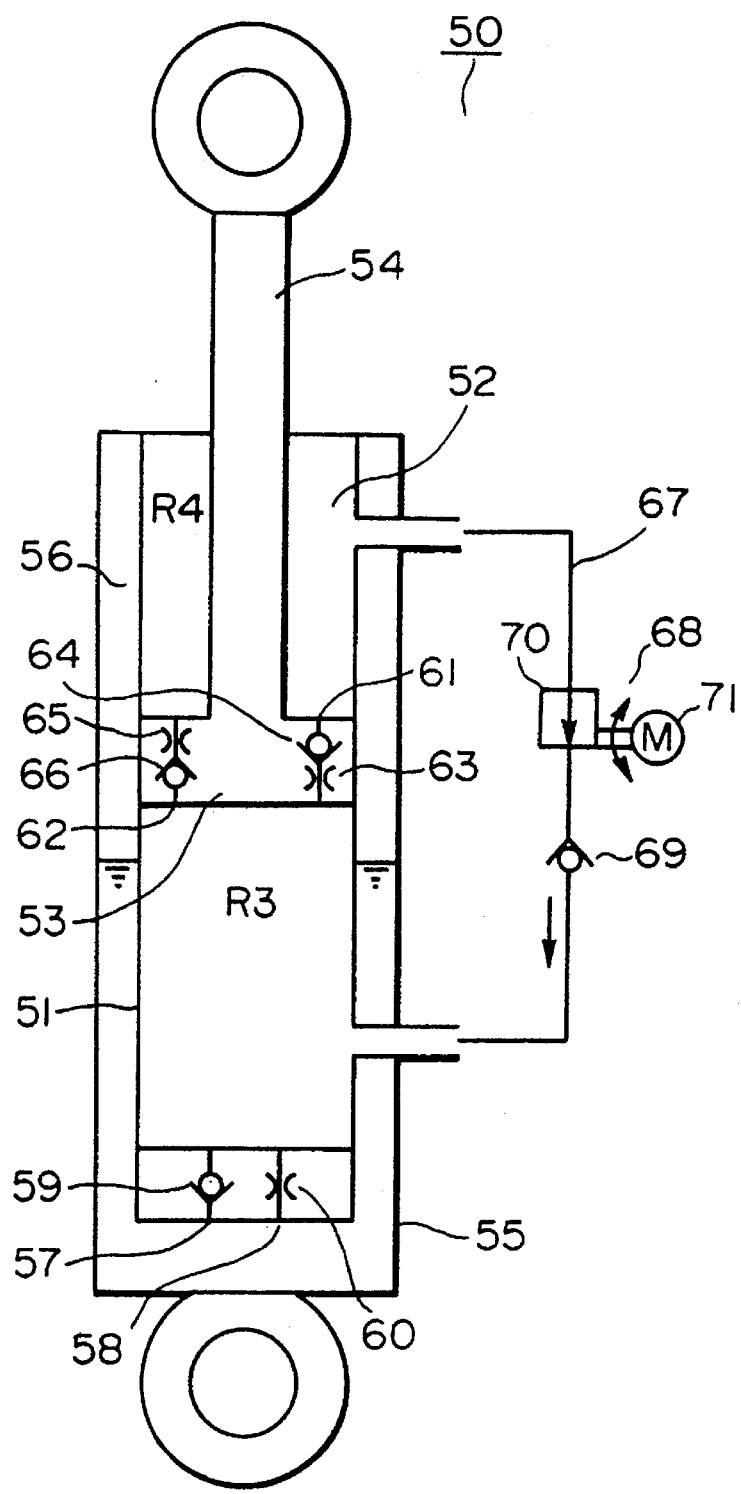
FIG. 10 is a sectional view showing the construction of a shock absorber 50 of a variable damping coefficient type in the fourth embodiment.

In FIG. 10, a piston 53 is slidably inserted in an oil chamber 52 leaving no space between them. The inside of the oil chamber 52 is divided into a lower chamber R3 and an upper chamber R4 by the piston 53. A piston rod 54 which extends outside a cylinder 51 through the upper chamber R4 is connected to the piston 53.

The cylinder 51 is provided in an outer shell 55. An enclosed chamber 56, enclosed by the cylinder 51 and the outer shell 55, which is isolated from the outside, is filled with a low pressure gas and an oil liquid. In a bottom portion of the cylinder 51, two communication paths 57 and 58 are provided. Each of the communication paths 57 and 58 communicates the enclosed chamber 56 and the lower chamber R3 of the oil chamber 52. In the communication path 57, a check valve 59 which admits only the flow of the oil liquid from the enclosed chamber 56 to the lower chamber R3 of the oil chamber 52, is provided. In the other communication path 58, a damping force generating mechanism 60 is provided. The damping force generating mechanism 60 admits only the flow of the oil liquid from the lower chamber R3 of the oil chamber 52 to the enclosed chamber 56, and generates a constant damping force when the oil liquid is transferred from the lower chamber R3 to the enclosed chamber 56, that is, damping force generating mechanism 60 generates a constant damping force when the shock absorber is compressed by the piston rod 54.

The piston 53 is provided with two communication paths 61 and 62 each of which communicates the lower chamber R3 and the upper chamber R4. In the communication path 61, a damping valve 63 and a check valve 64 are provided in series. The damping valve 63, which is usually closed, is opened to communicate the lower chamber R3 and the upper chamber R4 when the pressure difference between the lower and upper chambers R3 and R4 reaches a predetermined value due to an increase in the inner pressure of the lower chamber R3 during compression of the shock absorber. The check valve 64 admits only the flow of the oil liquid from the lower chamber R3 to the upper chamber R4. On the other hand, in the communication path 62, a damping valve 65 and a check valve 66 are provided in series. The damping valve 65, which is usually closed, is opened to communicate the lower chamber R3 and the upper chamber R4 when the pressure difference between the lower and upper chambers R3 and R4 reaches a predetermined value due to an increase of the inner pressure of the upper chamber R4 during extension of the shock absorber. The check valve 66 admits only the flow of the oil liquid from the upper chamber R4 to the lower chamber R3.

A bypass 67 for connecting the upper chamber R4 and the lower chamber R3 of the oil chamber 52 is provided along the cylinder 51. In the bypass 67, a damping force changing mechanism 68 and a check valve 69 which admits only the flow of the oil liquid from the upper chamber R4 to the lower chamber R3 are provided in series.

The damping force changing mechanism 68 comprises a throttle valve 70 provided in the bypass 67, and a rotary type electric actuator 71 for setting the opening degree of the throttle valve 70. The opening degree of the throttle valve 70 to the bypass 67 can be set in multi-stages by the rotary type electric actuator 71. However, the present invention is not restricted to such embodiments. For example, the opening degree of the throttle valve 70 to the bypass 67 may be set in non-stage by driving the rotary type electric actuator 71.

The throttle valve 70 has a rotary plate which is rotatably driven by the rotary type electric actuator 71.

An elongated opening is formed in the rotary plate on a circle concentric thereto, as shown in FIG. 3. The elongated opening has a width changing gradually in the direction of rotation. Variable portions of the elongated opening of the rotary plate face the bypass 67. The rotary plate of the throttle valve 70 is rotated a certain angle of $\theta1-\theta7$ by the rotary type electric actuator 71, so that the opening degree of the bypass 67 can be appropriately set, similar to that of the first embodiment.

The rotary plate of the throttle valve 70 has an initial position $\theta1$. The rotation angle of the rotary plate is set in the range of $\theta1-\theta7$ in which $0=\theta1<\theta2<\theta3<\theta4<\theta5<\theta6<\theta7$, so that the larger the rotation angle is, the larger the opening degree of the throttle valve 70 is. The opening degree of the throttle valve 70 is set to 0 at the initial position $\theta0$ at which the rotation angle of the rotary plate of the throttle valve 70 is 0, so that the oil liquid does not flow through the bypass 67.

However, the damping force changing mechanism 68 of the present invention is not restricted to have the throttle valve 70 and the rotary type electric actuator 71 as described in the embodiments. For example, the opening degree which corresponds to the rotation angle $\theta1-\theta7$, of the bypass 67 may be set by using a spool and a reciprocating actuator.

Figure 11:
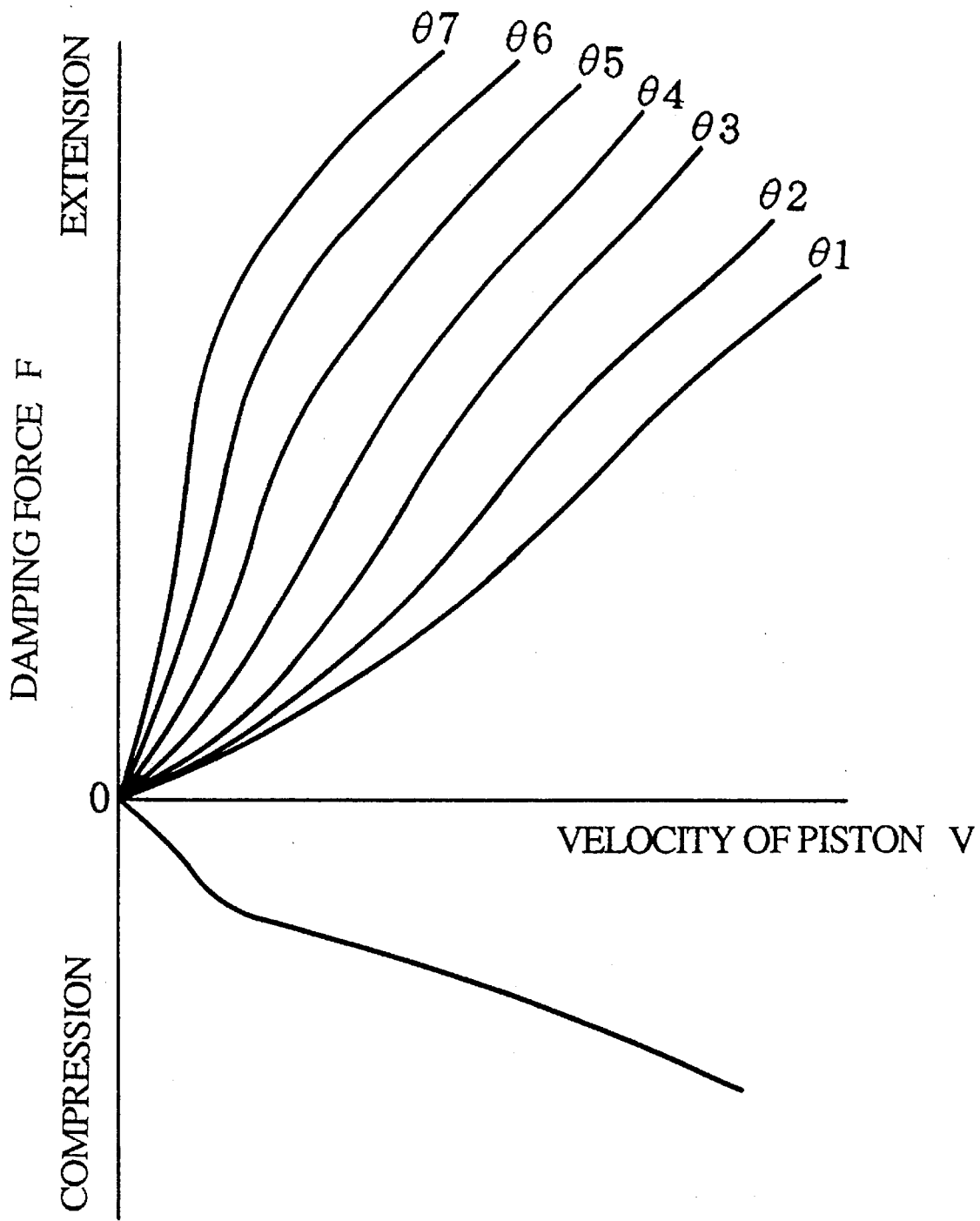
FIG. 11 is a graph showing the relationship between the rotation angle of the movable plate of the throttle valve 70, the damping coefficients during extension, and the damping coefficients during compression.
Figure 12:
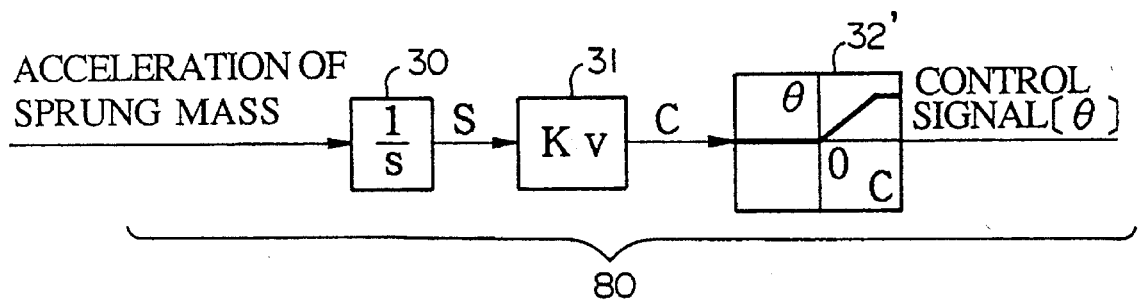
FIG. 12 is a block diagram showing the construction of the controller 80 in the fourth embodiment.

In the above described variable damping coefficient type shock absorber 50, a damping valve 63, which is usually closed but which opens when the pressure of the oil liquid in the lower chamber R3 reaches a predetermined value, is provided in the communication path 61; a damping valve 65, which is usually closed but which opens when the pressure of the oil liquid in the upper chamber R4 reaches a predetermined value, is provided in the communication path 62; and a damping force changing mechanism 68 for setting the passage area is provided in the bypass 67 which connects the upper chamber R4 and the lower chamber R3. Consequently, the damping coefficient during compression of the shock absorber is set to a constant value, and the damping coefficient during extension of the piston rod 54 can be adjusted. Corresponding to this, in the damping force changing mechanism 68, the rotary plate of the throttle valve 70 is rotated by one of the rotation angle $\theta1-\theta7$, so that it is possible to set the opening degree of the bypass 67. Therefore, it is possible to appropriately set the damping coefficient during extension of the shock absorber to the piston velocity, as shown in FIG. 11.

The construction of the controller 80 will be explained as follows. The controller 80 calculates a desired value C of the damping coefficient which is used for determining the rotation angle $\theta$ of the rotary plate of the throttle valve 70, and the rotatory plate is rotated on the basis of the desired value C.

The controller 80 comprises a block 30 (which is the same as that in the first embodiment) for computing the absolute velocity S of the body 1 by integrating the acceleration M of the sprung mass, a block 31 (which is the same as that in the first embodiment) for calculating the desired value C of the damping coefficient by multiplying the absolute velocity S of the body 1 computed in the block 30 by a control gain Kv, a block 32' for calculating the rotation angle $\theta$ of the rotary plate of the throttle valve 70 on the basis of the desired value C calculated in the block 31.

The controller 80 of the fourth embodiment of the present invention is different from that of the first embodiment of the present invention. That is, in the controller 80 of the fourth embodiment, the block 32' sets the relationship between the desired value C of the damping coefficient to be not less than 0 and the rotation angle $\theta$ of the rotary plate of the throttle valve 70, thereby the control of only the damping coefficient during extension of the shock absorber is carried out, as described above.

The difference between the case where the rotary plate of the variable damping coefficient type shock absorber 50 is controlled by the controller 80 and the case where the rotary plate of the variable damping coefficient type shock absorber 50 is not controlled by the controller 80 will be explained as follows, with reference to FIGS. 13(a) and (b).

Figure 13A:
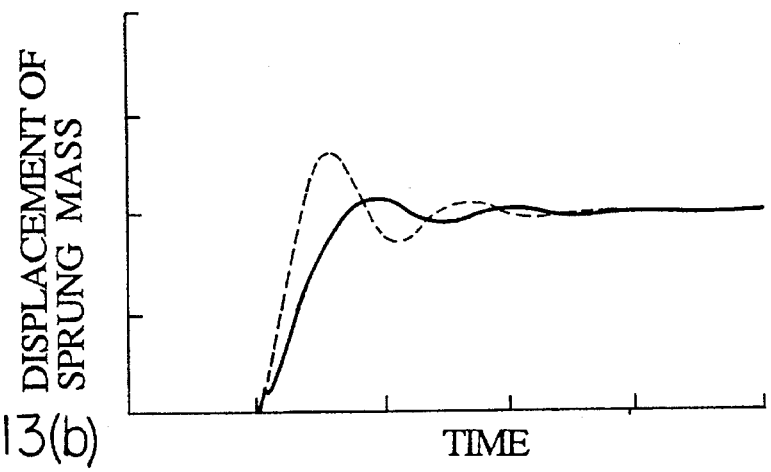
FIGS. 13(a) and (b) are graphs showing the relationship between the output for control when the vehicle runs on a step and the displacement of the sprung mass, when the vehicle is controlled by the controller 80.

The solid line in FIG. 13(a) indicates displacement of the body 1 controlled by the controller 80 when the vehicle runs on a step, and the dotted line indicates displacement of the body 1 not controlled by the controller 80. As seen from FIG. 13(a), it is confirmed that when the variable damping coefficient type shock absorber 50 is controlled by the controller 80, the amplitude of the vibration wave form after running on the step is smaller and a good vibration wave form can be obtained as compared to the case where the variable damping coefficient type shock absorber 50 is not controlled by the controller 80.

Figure 13B:
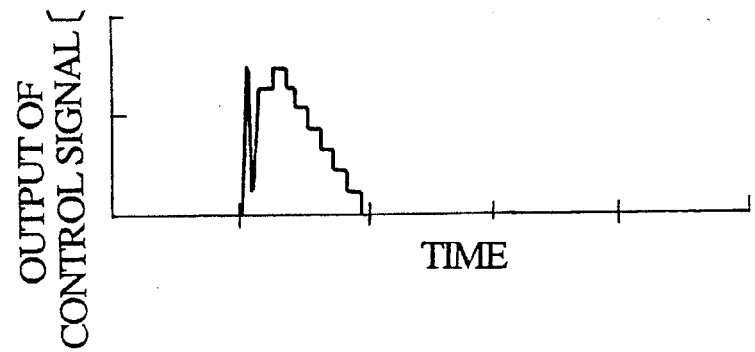

FIG. 13(b) is a graph showing the output content of the control signal [$\theta$] with respect to time when the variable damping coefficient type shock absorber 50 is controlled by controller 80. The magnitude of the control signal [$\theta$] is equivalent to the rotation angle $\theta$ of the rotary plate to be rotated. That is, as the rotation angle $\theta$ of the rotary plate of the throttle valve 70 becomes larger, the absolute value of the control signal [$\theta$] becomes larger corresponding to the rotation angle $\theta$.

As explained above in detail, in the suspension control device as described in the fourth embodiment of the present invention, the absolute velocity S of the body 1 is calculated on the basis of the detected signal of the acceleration sensor 5 attached to the body 1; and on the basis of the absolute velocity S, the desired value C of the damping coefficient is calculated. When the desired value C of the damping coefficient is not less than 0, the rotary plate of the throttle valve 70 is rotated in the positive direction, corresponding to the desired value C. That is, the suspension device of the embodiment carries out only the control of the damping coefficient during extension of the shock absorber. According to the embodiment, it is possible to simplify the content of control as compared to the control according to the first embodiment. The suspension control device according to the present embodiment does not require any height sensor for detecting the relative velocity or the relative displacement between the body and the wheel along the vertical direction, similar to the first embodiment. Thus, no damage due to the destruction of the height sensor is caused. Furthermore, since the suspension control device according to the present embodiment does not require any height sensor for a vehicle, decreased vehicle production costs may be expected.

Next, a fifth embodiment of the present invention will be explained with reference to FIGS. 14 and 15 as follows.

The construction of the fifth embodiment is similar to that of the fourth embodiment. The difference between the constructions of the fourth and fifth embodiments is the content of the block which constitutes the controller 81. The construction of the controller 81 is similar to that of the controller 40 of the second embodiment. However, the point of difference between the controller 81 and the controller 40 is the block 32'.

The controller 81 according to the fifth embodiment comprises a block 30 which is the same as that in the second embodiment, for computing the absolute velocity S of the body 1 by integrating the acceleration M of the sprung mass, a block 41 for computing a factor A, which corresponds to the desired value C of the damping coefficient in the first embodiment, by multiplying the computation of the block 30 by a gain Ks; a block 42 which is the same as that in the second embodiment, to which a detected signal representing acceleration is inputted from the acceleration sensor 5, for computing the absolute value B of the inputted acceleration; a block 43 which is the same as that in the second embodiment, for obtaining the desired value C by dividing the factor A obtained from the block 41 by the absolute value B of the acceleration obtained from the block 42; and a block 32', which is the same as that in the fourth embodiment, for obtaining the rotation angle θ of the rotary plate of the throttle valve 70 on the basis of the desired value C computed in the block 43.

The control by using the controller 81 will be explained as follows, with reference to FIGS. 15(a) and (b).

The solid line in FIG. 15(a) indicates displacement of the body 1 controlled by the controller 81 when the vehicle runs on a step, and the dotted line indicates displacement of the body 1 not controlled by the controller 81. FIG. 15(b) is a graph showing the output content of the control signal [θ] with respect to time when the variable damping coefficient type shock absorber 4 is controlled by controller 81. The magnitude of the control signal [θ] is equivalent to the rotation angle θ of the rotary plate of the throttle valve 70 to be rotated.

As seen from FIG. 15(a), it is confirmed that when the variable damping coefficient type shock absorber 4 is controlled by the controller 81, the amplitude of the vibration wave form after running on the step is smaller and good vibration wave form can be obtained as compared to the case that the variable damping coefficient type shock absorber 4 is not controlled by the controller 81.

As explained above in detail, the suspension control device of the fifth embodiment carries out only the control of the damping coefficient during extension of the shock absorber, similar to the fourth embodiment. According to the embodiment, it is possible to simplify the content of control. Unlike in the prior art, the suspension control device according to the present embodiment does not require any height sensor for detecting the relative velocity or the relative displacement between the body and the wheel along the vertical direction. Furthermore, the smaller the damping force of the shock absorber 4, the larger the resulting damping coefficient characteristics during extension of the shock absorber obtained can be. For example, when the vehicle runs on a step, the amplitude of the vibration wave form after running on the step can be rapidly made smaller to improve vehicle height characteristics of the shock absorber.

Figure 16:
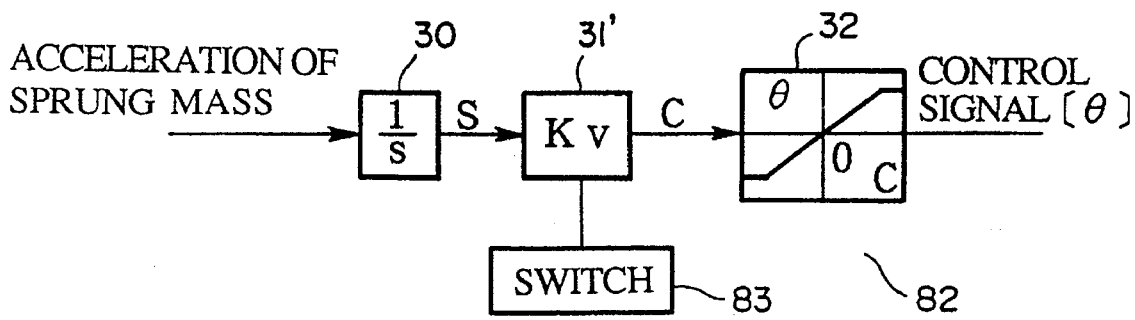
FIG. 16 is a block diagram showing the construction of the controller 82 in the sixth embodiment.
Figure 17:
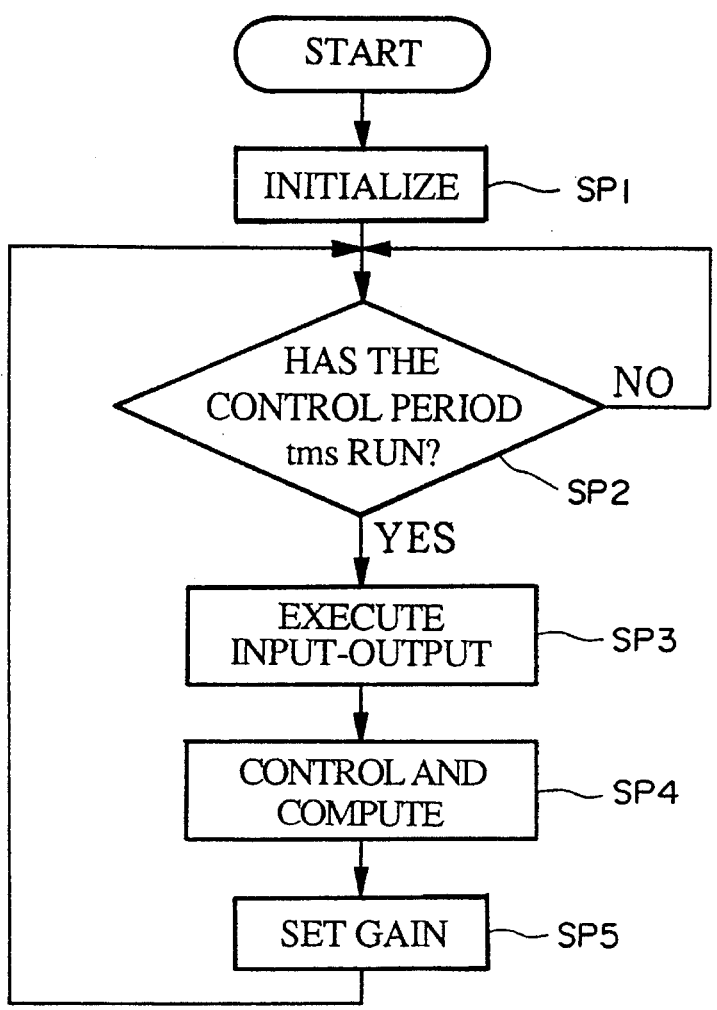
FIG. 17 is a flow chart showing the control content of the controller 82.

Next, a sixth embodiment of the present invention will be explained with reference to FIGS. 16–18 as follows.

The construction of the sixth embodiment is similar to that of the first embodiment. The point of difference between the constructions of the first and sixth embodiments is the content of the controller indicated by numeral 82. The construction of the controller 82 is similar to that of the controller 40 of the first embodiment. The difference between controller 82 and controller 40 of the first embodiment is that a switch 83 for changing the control gain Kv is provided in order to set the change of the control gain Kv for a block 31'.

The content of the controller 82 will be explained as follows.

Under the condition that an engine is started, the control gain Kv set for the block 31' is initialized (SP 1), and after a lapse of a predetermined time (SP 2), the detecting signal from the acceleration sensor 5 is inputted to the controller (SP 3). Then, the rotation angle θ of the rotary plate 25 is calculated on the basis of the acceleration M of the sprung mass detected by the acceleration sensor 5 (SP 4). In the next step SP 5, a control gain Kv for the block 31' is determined.

That is, the judgement whether the switch 83 for changing the control gain Kv is ON or not is carried out in SP 5A. When the switch 83 is OFF, i.e., NO, the control gain Kv is set to Kv1 which is for a normal mode in SP 5B. When the switch 83 is ON, i.e., YES, the control gain Kv is set to Kv2 which is for a sport mode in SP 5C. The control gain Kv1 for a normal mode and the control gain Kv2 for a sport mode have a relationship of Kv1<Kv2.

After the control gain is set to Kv1 or Kv2 in the SP 5C, the process is returned to the SP 2 and the treatments SP 2–5 are repeated again. When the switch 83 is operated, the settlement of the control gain Kv is rapidly changed.

In the sixth embodiment, the control gain Kv is changed by the switch 83. However, the switch 83 may be operated by a horizontal acceleration sensor provided separately for detecting the horizontal acceleration.

In the embodiment, the control gain is changed by the switch 83 in two steps, however, the present invention is not limited to this. The control gain may be changed in three or more steps, or continuously. The changing system of the control gain can be adopted for the suspension control device of the type as shown in FIG. 10.

As described above, according to the suspension control device of the sixth embodiment, it is possible to change the settlement of the control gain Kv1 or Kv2 by the switch 83 and to select the control gain according to the driver's preference or the behavior of the car.

The suspension device as described in each of the above embodiments is provided on each wheel of the vehicle. However, it is possible to simplify the control without reducing practical performance, by using shock absorbers in which the damping coefficients in both the extension and in the compression are controlled, such as the shock absorber shown in the first embodiment, for the front wheels which are heavy in weight because of an engine provided on an upper portion to the side of the front wheels, and by using shock absorbers in which only the damping coefficient in the extension is controlled, such as the shock absorber shown in the fourth embodiment, or shock absorbers in which damping coefficient is not controlled, for the rear wheels which are light in weight.

The present invention discloses a suspension device for restraining vibration of the body of the vehicle. However, it is possible to provide a comfortable ride and to improve controllability of the vehicle by combination of the control according to the present invention and the control for restraining roll, nose dive or squat of the vehicle by using a lateral acceleration or a longitudinal acceleration.

As described above, according to the present invention, the absolute velocity of the vertical vibration of the vehicle body is calculated and the coefficient during extension and the coefficient during compression of the shock absorber are adjusted on the basis of the direction of the absolute velocity, so that it is possible to effectively restrain vibration of the body and to provide a comfortable ride. Furthermore, the present invention does not require any height sensor for detecting the relative velocity or the relative displacement between the body and the wheel along the vertical direction. Thus, no damage due to destruction of the height sensor is incurred.

What is claimed is:

1. A suspension control device for a vehicle comprising:
   a variable damping coefficient shock absorber provided between a body of the vehicle and a wheel of the vehicle, the variable damping coefficient shock absorber further comprising:
   a cylinder for containing a fluid therein;
   a piston slidably disposed in the cylinder and dividing the interior space of the cylinder into two chambers;
   a first communication passage through which the fluid of the first chamber, compressed by the piston, flows during extension of said shock absorber;
   a second communication passage through which the fluid of the second chamber, compressed by the piston, flows during compression of said shock absorber;
   means for varying the effective cross section of said first communication passage, wherein the damping coefficient of the shock absorber is varied between a large value and a small value in accordance with the extension of said shock absorber;
   an actuator operatively connected to said means for varying the effective cross section of said first communication passage for effectively varying the cross section of said first communication passage;
   a vertical absolute velocity detecting means for detecting the vertical absolute velocity of said body of the vehicle; and
   a controller outputting a control signal to said actuator of said shock absorber for varying said damping coefficient of said shock absorber in response to said vertical absolute velocity of said body of the vehicle, whereby, when it is judged that the body is moving in the upward direction on the basis of the vertical absolute velocity, said control signal causes the actuator to decrease the cross section of said first communication passage for increasing the damping coefficient of said shock absorber during extension in relation to an increase in the vertical absolute velocity and said control signal causes the actuator to increase the cross section of said first communication passage for decreasing the damping coefficient of said shock absorber during extension in relation to a decrease in the vertical absolute velocity so that the damping coefficient during extension has a value approximately equal to the product of at least the vertical absolute velocity and a control gain, and, when it is judged that the body is moving in the downward direction on the basis of the vertical absolute velocity, said control signal causes the actuator to maintain the damping coefficient of said shock absorber during extension at a small value.

2. A suspension control device for a vehicle according to claim 1, said means for varying the effective cross section of said first communication passage further comprising a movable member having a through-slot of tapering shape formed therein, the movable member being movable with respect to the first communication passage to vary the operative size of the first communication passage so as to vary the damping coefficient of the shock absorber with respect to the extension of the shock absorber.

3. A suspension control device for a vehicle according to claim 1, wherein said control signal makes the damping coefficient during extension have a value approximately equal to the value which is obtained by correcting the product of the vertical absolute velocity and the control gain on the basis of the value of an acceleration of said body of the vehicle when it is judged that the body is moving in the upward direction on the basis of the vertical absolute velocity.

4. A suspension control device for a vehicle according to claim 3 wherein said control gain is varied on the basis of the value of said acceleration of said body of the vehicle in order to correct the product of said vertical absolute velocity and said control gain on the basis of the value of said acceleration of said body of the vehicle.

5. A suspension control device for a vehicle according to claim 4 wherein said control gain becomes smaller as the absolute value of the vertical acceleration of the body becomes larger.

6. A suspension control device for a vehicle according to claim 1, the variable damping coefficient shock absorber further comprising:
   second means for varying the effective cross section of said second communication passage for varying the damping coefficient of the shock absorber between a large value and a small value in accordance with the compression of said shock absorber;
   said actuator operatively connected to said second means for varying the cross section of said second communication passage for effectively varying the cross section of said second communication passage; and
   said controller further outputting a control signal to said actuator of said shock absorber for varying said damping coefficient of said shock absorber in response to said vertical absolute velocity of said body of the vehicle, whereby, when it is judged that the body is moving in the downward direction on the basis of the vertical absolute velocity, said control signal causes the actuator to decrease the cross section of said second communication passage for increasing the damping coefficient of said shock absorber during compression in relation to an increase in the vertical absolute velocity, and said control signal causes the actuator to increase the cross section of said second communication passage for decreasing the damping coefficient of said shock absorber during compression in relation to a decrease in the vertical absolute velocity, and when it is judged that the body is moving in the upward direction on the basis of the vertical absolute velocity, said control signal causes the actuator to maintain the damping coefficient of said shock absorber during compression to have a small value.

7. A suspension control device for a vehicle according to claim 6 wherein said control gain is variable.

8. A suspension control device for a vehicle according to claim 7 wherein said control gain becomes smaller as the absolute value of the vertical acceleration of the body becomes larger.

9. A suspension control device for a vehicle according to claim 6, wherein said control signal causes the damping coefficient during compression to be approximately equal to the value of the product of the vertical absolute velocity, the control gain and an inverse of an absolute value of an acceleration of the vertical vibration when it is judged that the body is moving in the downward direction on the basis of the absolute velocity.

10. A suspension control device for a vehicle according to claim 6, said second means for varying the effective cross section of said second communication passage comprising a movable member having a through-slot of tapering shape formed therein, the movable member being movable with respect to the second communication passage to vary the operative size of the second communication passage so as to vary the damping coefficient of the shock absorber with respect to the compression of the shock absorber.

11. A suspension control device for a vehicle according to claim said means for varying the effective cross section of said first communication passage also varying the effective cross section of said second communication passage for varying the damping coefficient of said shock absorber with respect to the compression of the shock absorber;

wherein when it is judged that the body is moving in the upward direction, said control signal increases the damping coefficient of said shock absorber during extension in relation to an increase in the vertical absolute velocity and maintains the damping coefficient of said shock absorber during compression at a small value, and when it is judged that the body is moving in the downward direction, said control signal maintains the damping coefficient of said shock absorber during extension at a small value and increases the damping coefficient of said shock absorber during compression in relation to an increase in the vertical absolute velocity.

12. A suspension control device for a vehicle according to claim 11, said control signal makes the damping coefficient during compression have a small value when it is judged that the body is moving in the upward direction on the basis of the vertical absolute velocity, and the control signal makes the damping coefficient during compression have a value approximately equal to the value of the product of at least the vertical absolute velocity and the control gain when it is judged that the body is moving in the downward direction on the basis of the vertical absolute velocity.

13. A suspension control device for a vehicle according to claim 12 wherein said control signal causes the damping coefficient during compression to have a small value and makes the damping coefficient during extension approximately equal to the value of the product of the vertical absolute velocity, the control gain and an inverse of an absolute value of an acceleration of the vertical vibration when it is judged that the body is moving in the upward direction on the basis of the vertical absolute velocity, and the control signal causes the damping coefficient during extension to have a small value and the damping coefficient during compression approximately equal to the value which is obtained by correcting the product of the vertical absolute velocity and a control gain on the basis of the inverse of the absolute value of an acceleration of the vertical vibration when it is judged that the body is moving in the downward direction on the basis of the absolute velocity.

14. A suspension control device for a vehicle according to claim 1, wherein said control gain is variable.

15. A suspension control device for a vehicle according to claim 14, wherein said control gain becomes smaller as the absolute value of an acceleration of the body is larger.

16. A suspension control device for a vehicle according to claim 1, wherein said control signal makes the damping coefficient during extension approximately equal to the value of the product of the vertical absolute velocity, the control gain and an inverse of an absolute value of an acceleration of the vertical vibration when it is judged that the body is moving in the upward direction on the basis of the vertical absolute velocity.

\* \* \* \* \*

UNITED STATES PATENT AND TRADEMARK OFFICE
CERTIFICATE OF CORRECTION

PATENT NO. : 5,533,597
DATED : July 9, 1996
INVENTOR(S) : Takashi Nezu, Kenjiro Matsumoto, Takao Kohara, Hiroshi Sakai, Masaaki Uchiyama It is certified that error appears in the above-indentified patent and that said Letters Patent is hereby corrected as shown below:

In column 21, line 15, after "claim" insert --1,--.

In column 21, line 37, after "11," insert --wherein--.

Signed and Sealed this

Seventeenth Day of September, 1996

Attest:

BRUCE LEHMAN

Attesting Officer

Commissioner of Patents and Trademarks